United States Patent
Iyer et al.

(10) Patent No.: US 9,104,713 B2
(45) Date of Patent: Aug. 11, 2015

(54) MANAGING A TEMPORAL KEY PROPERTY IN A DATABASE MANAGEMENT SYSTEM

(75) Inventors: Balakrishna R. Iyer, San Jose, CA (US); Robert W. Lyle, Morgan Hill, CA (US); Jerry Mukai, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 69 days.

(21) Appl. No.: 13/253,879

(22) Filed: Oct. 5, 2011

(65) Prior Publication Data

US 2013/0091112 A1    Apr. 11, 2013

(51) Int. Cl.
*G06F 17/30* (2006.01)
*G06F 15/16* (2006.01)

(52) U.S. Cl.
CPC .... *G06F 17/30345* (2013.01); *G06F 17/30368* (2013.01); *G06F 17/30371* (2013.01)

(58) Field of Classification Search
CPC ................................................. G06F 17/30345
USPC ........................................................ 707/746
See application file for complete search history.

(56) References Cited

U.S. PATENT DOCUMENTS

| 5,551,024 | A  * | 8/1996 | Waters ................................. 1/1 |
| 6,684,215 | B1 * | 1/2004 | Saracco ......................... 707/702 |
| 7,483,906 | B2   | 1/2009 | MacCormick |

| 2003/0182272 | A1 * | 9/2003  | Leung et al. ...................... 707/3 |
| 2007/0130171 | A1   | 6/2007  | Hanckel et al. |
| 2011/0320419 | A1 * | 12/2011 | Johnston et al. .............. 707/703 |

FOREIGN PATENT DOCUMENTS

| CA | 2702133 A1 | 7/2010 |
| JP | 01163826   | 6/1989 |

OTHER PUBLICATIONS

Jan Chomicki et al., "Temporal Databases," Foundations of Artificial Intelligence, vol. 1, 1997 (Available online Jun. 2007) pp. 429-468, <http://www.cs.uwaterloo.ca/~david/cs848/chomickitoman.pdf>.

Anonymous et al., "Methodology and apparatus for real-time data validation for an online database," Oct. 2010, pp. 1-5, <http://ip.com/IPCOM/000200601>.

Ling Lin, "A Value-Based Indexing Technique for Time Sequences," Department of computer and information science, Linkoping University, 1997, pp. 1-86.

* cited by examiner

*Primary Examiner* — Brittany N Allen
(74) *Attorney, Agent, or Firm* — Patterson & Sheridan, LLP

(57) ABSTRACT

Embodiments provide an approach for efficiently searching a temporal key index as well as enforcing key distinctiveness property in a database table corresponding to the index. For example, by addressing time range overlaps in an index having a sort order for temporal keys, a database management tool of a server system may efficiently process client requests while enforcing a temporal key property in the database table.

15 Claims, 9 Drawing Sheets

MANAGING A TEMPORAL KEY PROPERTY IN A DATABASE MANAGEMENT SYSTEM

BACKGROUND

Embodiments of the invention are directed to techniques for maintaining data integrity in a relational database management system (RDBMS). More specifically, embodiments of the invention provide a method for managing an index used to enforce a temporal key property in a RDBMS table.

A RDBMS supports the declaration and automatic enforcement of keys for a table. RDBMS applications, such as a database management tool, enforce keys to help maintain the integrity of data in the RDBMS and to reduce application complexity. A unique key is a column or a set of columns in a table for which any specific value or combination of values in the column or set of columns appears in at most one row of the table. In other words, considering only the key column or set of columns, the specific value or combination of values therein are unique to a row of the table. Enforcing a key ensures that the specific values (or combination of values) of a key column (or set of columns) remain distinct following deletions, insertions, and updates of table rows.

A temporal key adds a time dimension to a database key. The time dimension associates a start and an end time with a database key (or multi-column key). The time dimension allows the same key to occur in a database table, so long as the time dimensions do not overlap. If a temporal key is defined for a table column or set of columns, then any specific value or combination of values in the column or set of columns appears in no more than one row of the table at any given point in time. In other words, considering only the temporal key column or set of columns, the values or combination of values therein are unique to a row of the table at any given point in time.

A database management tool may enforce a temporal key property by maintaining an index on a temporal key column (or a set of columns) in a database table. The database management tool may consult and manage entries in the index in response to database table requests.

SUMMARY

Embodiments of the invention may be used to manage database requests while maintaining database integrity. One embodiment of the invention includes a method for enforcing a temporal key property in a database table. This method may generally include receiving a request to insert a database row in the table. The request may include a temporal key and an associated start time and an end time. This method may also include accessing, by operation of one or more computer processors, an index of the temporal keys in the table, wherein the index sorts entries according to the temporal keys and associated start times and end times of the entries. Upon determining that the index includes at least a first entry having the temporal key of the request, the method includes determining whether the start time and the end time in the request overlaps with the start time and the end time of at least the first entry. If so, the request is rejected.

In a particular embodiment, upon determining the start time and the end time of the request does not overlap with the start time and the end time of any entry in the index having the temporal key of the request, an entry is added to the index corresponding to the request and a database row is inserted into the table corresponding to the request.

Another embodiment of the invention includes a method for enforcing a temporal key property in a database table. The method may include receiving a request to perform a searched update of one or more database rows in the table. Each requested update may include a temporal key and an associated start time and end time. Further, the method may include accessing an index corresponding to temporal keys in the table, wherein each entry in the index includes one of the temporal keys and an associated start time and end time.

For each requested update, the method may include deleting the database row to be updated. Upon determining that the index does not include an entry having the temporal key of the update, the method may include adding an entry to the index that corresponds to the update and inserting a database row into the table that corresponds to the update. Upon determining that the index includes an entry having the temporal key of the update, the method may include determining whether an overlap exists between the update and an index entry. Upon determining that no overlap exists, the method may include adding an entry to the index that corresponds to the update and inserting a database row into the table that corresponds to the update. Upon determining that an overlap exists, the method may include storing a pointer to the update in an overlap data structure.

For each update referenced by a pointer stored in the overlap data structure, the method may include determining whether an index includes an entry having the temporal key of the update. Upon determining that the index does not include an entry having the temporal key of the update, the method may include adding an entry to the index that corresponds to the update and inserting a database row into the table that corresponds to the update. Upon determining that the index includes an entry having the temporal key of the update, the method may include determining whether an overlap exists between the update and an index entry. Upon determining that no overlap exists, the method may include adding an entry to the index that corresponds to the update and inserting a database row into the table that corresponds to the update. Upon determining that an overlap exists between the update and an index entry, the method may include rejecting the update.

Still another embodiment of the invention includes a computer-implemented method for enforcing a temporal key property in a database table. This method may include receiving a request to insert a database row in the table. The request includes a temporal key and an associated start time and an end time. This method may also include searching, by operation of one or more computer processors, an index of the temporal keys in the table, wherein the index sorts entries according to one of (i) a sort order defined on the temporal key, end time, and start time of the index entries and (ii) a sort order defined on the temporal key, start time, end time of the entries. The index is searched for a first entry using a reverse sort order of the start time and end time of the request, relative to defined sort order of the index. If the temporal key of the first entry matches the temporal key of the request, then the method includes determining whether the start time and the end time in the request overlaps with the start time and the end time of the first entry, and if so, rejecting the request.

Still another embodiment includes a computer-implemented method for accessing an index of temporal keys in a database table. This method may generally include receiving a request to probe the index of the temporal keys, where the request includes a temporal key and an associated start time and an end time. This method may also include identifying, by operation of one or more computer processors, an entry in the index of the temporal keys in the table to return in response to the request. The index may sort entries according to one of (i) a sort order defined on the temporal key, end time and start time of the index entries and (ii) a sort order defined on the temporal key, start time, end time of the entries. The index is searched using a reverse sort order of the start time and end time of the request, relative to defined sort order of the index. This method may also include returning, in response to the request, the identified entry.

Additional embodiments include a computer-readable storage medium storing an application, which, when executed on a processor, performs one or both of the above recited methods as well as a system having a processor and a memory storing a content management application program, which, when executed on the processor, performs one or both of the above recited methods.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

Note, however, that the appended drawings illustrate only typical embodiments of this invention and are therefore not to be considered limiting of its scope, for the invention may admit to other equally effective embodiments.

DETAILED DESCRIPTION

Figure 1:
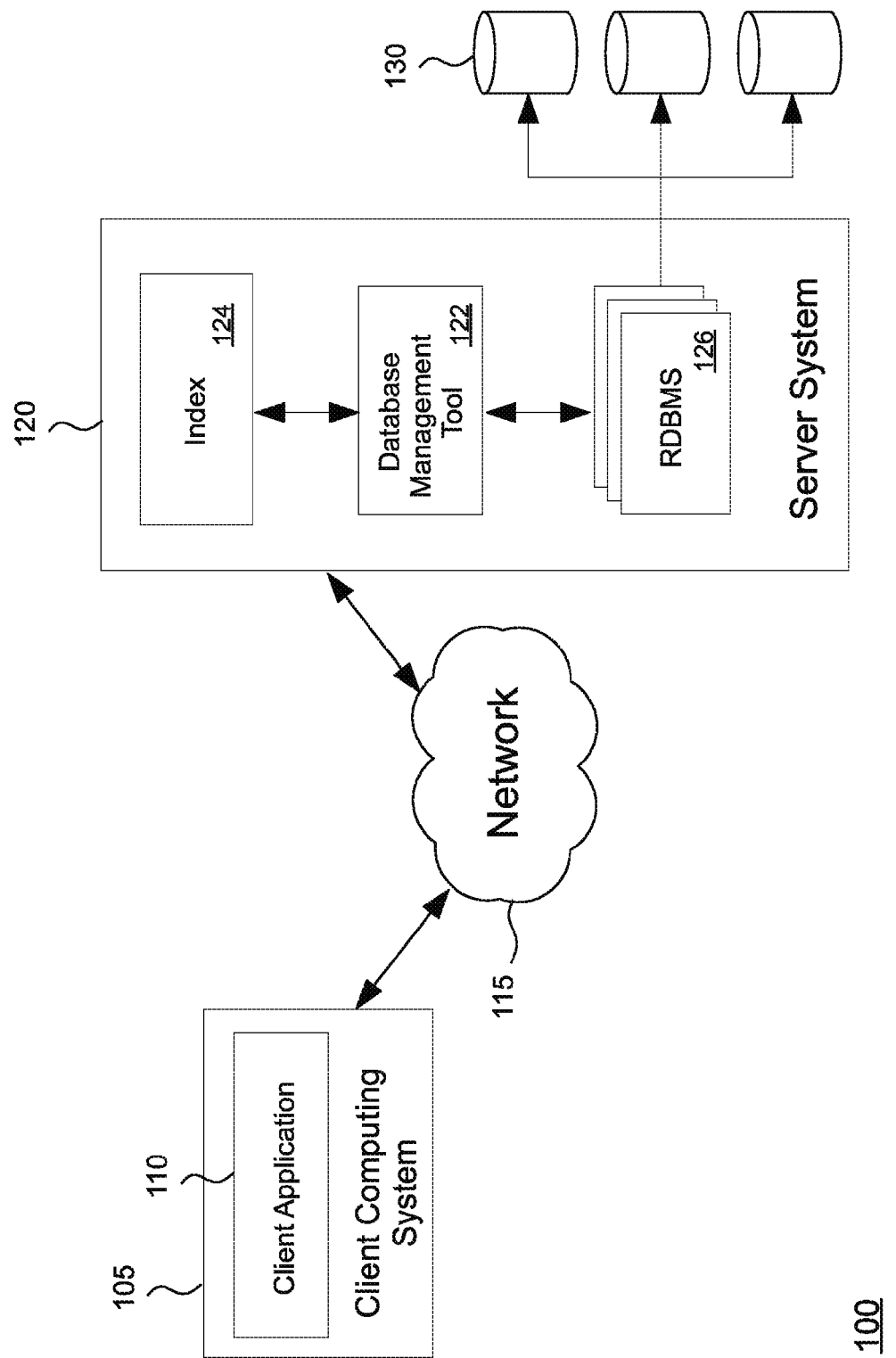
FIG. 1 illustrates a computing infrastructure configured for managing database requests for one or more client systems, according to one embodiment of the invention.

Embodiments of the invention provide techniques for enforcing a temporal key property of a column (or set of columns) in a database table. The temporal key property ensures that values (or combinations of values) in a temporal key column (or set of columns) do not overlap for periods of time relative to one another. For example, assume index entries are defined using an account number, along with a start time and an end time over which the account number is valid, i.e., (account, Start time, End time). Each entry in the index needs to be unique, relative to other values in the key column. However, the conventional methods for defining and enforcing unique entries in the index do not work for temporal keys. This occurs as two temporal keys may share the same account number, but have an overlapping time range. In this case, searching the index for an exactly matching entry, i.e., a matching (account, Start time, End time) will not reveal overlapping time ranges. Thus, simply checking for an exact key match is inadequate to enforce the temporal key property.

In one embodiment, a database management tool may enforce a temporal key property of a column by managing an index corresponding to temporal keys in the database table. The index provides a data structure that stores entries according to a sort order. For example, the index may sort temporal key values in an ascending or descending sort order. Each index entry may include a key value and an associated time range (e.g., a start time and an end time). The sort order may further sort entries by start time or end time. For example, account numbers may be sorted numerically, and entries sharing the same account number may be further sorted based on the start time.

A request to insert or update a row in a database table may be sent from a client computing system to the server system. The request may include a temporal key and an associated time range (start time and end time). The database management tool may probe the index to determine whether the time range in the request overlaps with a time range of an index entry having the same key as the request. If an overlap exists, the management tool may prevent the insertion or update.

In one embodiment, the index management tool may support bi-directional searches for a given input or candidate key, relative to the sort order, using a prior and a next function. Given a candidate key having a key, start time, and end time (and assuming an ascending sort order), the next function identifies an index entry (if one exists) that would immediately follow the candidate key, relative to the sort order. Conversely, the prior function identifies the index entry that would immediately precede the candidate key, relative to the sort order. In another embodiment, the index management tool may support unidirectional searches relative to the sort order. That is, the index management tool may support only one of the prior function or the next function.

When analyzing a request using an index with a bi-directionally navigable sort order, the database management tool may determine whether an overlap exists by determining both (i) a subsequent index entry, which is the lowest entry in the index that sorts higher than the request and that has the same temporal key as the request, and (ii) a prior index entry, which is the highest entry in the index that sorts lower than the request and that has the same temporal key as the request. An overlap between the candidate key and the index then may be identified by comparing the values in the index entries returned using the prior and next functions.

When analyzing a request using an index with a uni-directionally navigable sort order, the database management tool may determine whether an overlap exists by identifying either a subsequent index entry (in the case of the next function) or a prior index entry (in case of the prior function), but not both. For example, assume the management tool supports the next function and returns the next-highest entry based on an input, or candidate key and that the index is sorted on key, start time and end time. In such a case, given a candidate key of (key, start time, end time), the search is performed using a probe of (key, end time, start time)—note the reversal of start time and end time. That is, if the index is sorted on key, start time, then end time, the index is probed using key, end time or vice-versa.

Doing so reveals an index entry (if one exists) having a key value with a start time that is the next highest entry in the index following the end time of the candidate key. The start time and end time of this key value may then be compared with values in the candidate key to determine whether an overlap exists. Stated differently, reversing the time values of the candidate key reveals whether an overlap exists between the candidate key and the (temporally) closest index entry, without having to invoke calls of the prior and next functions.

Note, the examples described below generally rely on an index with an ascending sort order (where lower values occur first in the index) and the use of the next function, which returns the immediately greater entry in the index (relative to the sort order) for an input or candidate key. However, one of ordinarily skill in the art will readily recognize that the approaches described herein may be adapted to work with a temporal key index having a descending sort order. Further, while a temporal key index may store key values sorted as (key, start time, end time), one of ordinary skill in the art will readily recognize that the approaches described herein may be adapted for an index storing entries as (key, end time, start time).

The database management tool may respond to requests to insert new rows into the table by determining whether the time range of an index entry having the same temporal key as the request overlaps any time point within the time range of the request. If the tool determines that a time range overlap exists, then the tool may reject the requested insertion to enforce the temporal key property. Conversely, if the tool determines that an overlap does not exist, then the tool may add an index entry corresponding to the request and may insert a database row corresponding to the insert request. In response to a request to update a row in a database table, the database management tool may delete the existing index entry and database row referenced in the request. Provided that an overlap does not exist, the tool then may insert a new index entry and database row corresponding to the update request.

Further, while examples are described below regarding the enforcement of temporal key properties, one of ordinary skill in the art will recognize that the approaches for index ordering provide an efficient approach for querying an index of temporal keys with a candidate or target value (e.g., a key, start time, end time). For example, an SQL select statement can efficiently parse the index to identify whether a given entry is present in the index. And if so, data for the row can be returned from the database table (or joined with data from other tables).

Further still, the database management tool may respond to a group update request by deleting each database row to be updated and inserting a new row for each update for which no overlap exists. Temporary time range overlaps may occur during the group update process, as update requests may overlap with entries yet to be updated. Once all entries are updated, such temporary overlaps are no longer permitted. The tool may address such temporary overlaps by storing each update for which an overlap initially exists into an overlap data structure and subsequently attempting to insert each stored update.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the present invention, the database management tool may be deployed to a computing cloud (whether the cloud itself is provided by the enterprise or a third party). For example, the database management tool may manage cloud-based database systems, virtual machines, and a variety of other server applications.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Further, particular embodiments of the invention describe a database management system for managing an index used to enforce a temporal key property. However, it should be understood that the techniques described herein may be adapted to a variety of purposes in addition to enforcing a temporal key property. Accordingly, references to the specific embodiment are included to be illustrative and not limiting.

FIG. 1 illustrates a computing infrastructure 100 configured for managing database requests, according to one embodiment of the invention. As shown, the computing infrastructure 100 includes a client computing system 105 and a server system 120, each connected to a communications network 115.

Illustratively, the client computing system 105 includes a client application 110 used to communicate with the server system 120 over the network 115 in order to submit database requests to the server system 120. Although shown as a single client computing system, the client computing system 105 is included to be representative of a single client or multiple clients. The server system 120 may include a database management tool 122, an index 124 and a RDBMS 126. The database management tool 122 may process requests sent by the client computing system 105 to the server system 120. As part of processing client requests, the database management tool 122 may send database management requests to the RDBMS 126. The RDBMS 126 includes a software application configured to manage relational databases 130. While FIG. 1 illustrates three relational databases 130, the computing infrastructure 100 may include any number of relational databases 130. The index 124 may store values corresponding to database table columns managed by the database management tool 122. Specifically, the index 124 may store temporal key values corresponding to a temporal key table column, start time values corresponding to a start time column, and end time values corresponding to an end time column. The start time value and an end time value may indicate a time range for the designated temporal key value. A data structure efficient for rapidly searching sorted data, e.g., a B+ tree, may be selected for the index 124.

Figure 2:
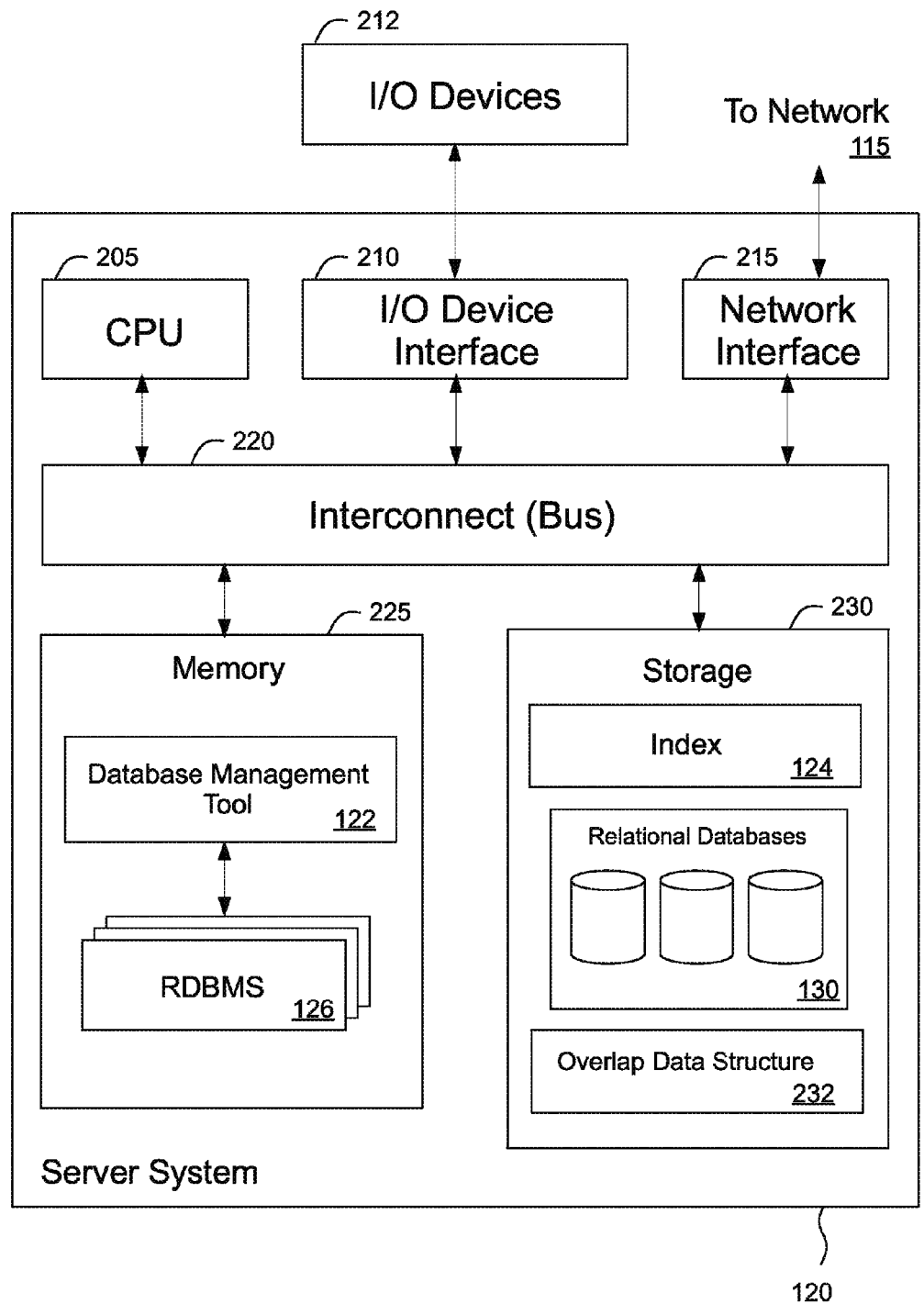
FIG. 2 illustrates a server system configured for enforcing a temporal key property of a RDBMS, according to one embodiment of the invention.

FIG. 2 illustrates an example of the server system 120 configured to manage database requests, according to one embodiment of the invention. As shown, the server system 120 includes, without limitation, a central processing unit (CPU) 205, a network interface 215, an interconnect (i.e., bus) 220, a memory 225, and storage 230. The server system 120 also may include an I/O device interface 210 connecting I/O devices 212 (e.g., keyboard, display, and mouse devices) to the server system 120.

The CPU 205 may retrieve and execute programming instructions stored in the memory 225. Similarly, the CPU 205 may retrieve and store application data residing in the memory 225. The interconnect 220 may facilitate transmission, such as of programming instructions and application data, among the CPU 205, I/O device interface 210, storage 230, network interface 215, and memory 225. CPU 205 is included to be representative of a single CPU, multiple CPUs, a single CPU having multiple processing cores, and the like. Additionally, the memory 225 is included to be representative of a random access memory. Furthermore, the storage 230 may be a disk drive storage device. As shown, the memory 225 includes the database management tool 122 and the RDBMS 126.

Although shown as a single unit, the storage 230 may be a combination of fixed and/or removable storage devices, such as fixed disc drives, floppy disc drives, tape drives, removable memory cards or optical storage, network attached storage (NAS), or a storage area-network (SAN). As shown, the storage 230 includes the index 124, the relational databases 130 and an overlap data structure 232.

In one embodiment, the database management tool 122 enforces a temporal key property of a column (or set of columns) in a database table located in the relational databases 130 by managing the index 124. For example, the database management tool 122 may respond to requests by the client computing system 105 to insert or update records in the databases 130. To enforce such a temporal key property, the index 124 may store each key value, and the associated start time and end time for each row of the corresponding database table. Further, the index 124 may store the keys (and start times and end times) in a sorted order (e.g., ascending by key value, then start time).

Accordingly, in response to a request to insert a row in a database table, the database management tool 122 may probe the index 124 to determine whether the time range provided in the request overlaps at any point in time with a time range of an index entry. If no time range overlap exists, the database management tool 122 may add an index entry corresponding to the request and direct the RDBMS 126 to insert a database row corresponding to the request. If a time range overlap exists, the tool 122 may enforce the temporal key property by preventing the insertion. In response to a request to update a row in a database table, the database management tool 122 may delete the database row and index entry corresponding to the update. If no time range overlap exists, the database management tool 122 may add an index entry corresponding to the update and may direct the RDBMS 126 to insert a database row corresponding to the update. If a time range overlap exists, the tool 122 may enforce the temporal key property by preventing the update.

The database management tool 122 may respond to a set or group update request by deleting each database row to be updated and inserting a new row for each update for which no time range overlap exists. Temporary overlaps may occur during the set or group update process, as newly updated index entries may overlap with entries yet to be updated. In one embodiment, the database management tool 122 addresses temporary overlaps by storing each update for which an overlap initially exists into the overlap data structure 232 and subsequently attempting to insert each stored update. Accordingly, the overlap data structure 232 enables the database management tool 122 to complete an update which allow for a temporary overlap between entries to occur during the update process.

The description herein follows the convention such that a specified start time is included in the time range and the range extends up to but does not include a specified end time. This convention is referred to as the (inclusive, exclusive) convention for the time range. One of skill in the art will recognize that the embodiments may be adapted to follow the other three conventions for the time range, specifically the (exclusive, inclusive) convention, the (exclusive, exclusive) convention, and the (inclusive, inclusive) convention.

The database management tool 122 may determine whether a time range overlap exists by probing index entries with the same temporal key as a request being processed. The tool 122 may identify a total time range overlap by determining whether an index entry exists having the same temporal key, start time, and end time as the request. The tool 122 may probe index entries to determine whether a partial time range overlap exists, depending on the sort order of the index 124.

The index 124 may have a bi-directionally navigable sort order. When addressing a request with an index having a bi-directionally navigable sort order, the database management tool 122 may determine whether a partial time range overlap exists by probing both (i) a prior index entry and (ii) a subsequent index entry. In this context, a prior index entry is the highest entry in the index that sorts lower than the request, and a subsequent index entry is the lowest entry in the index that sorts higher than the request. If either prior index entry or the subsequent index entry shares a key value, then the management tool 122 may compare the time ranges to see if an overlap exists. That is, the tool 122 may determine whether an overlap exists by determining whether a prior index entry exists having an end time after the request start time or by determining whether a subsequent index entry exists having a start time prior to the request end time. In such a case the tool 122 may decline to insert a given key, or perform an update to an existing key.

Alternatively, the index 124 may have a uni-directionally navigable sort order. When processing a request with an index having a uni-directionally navigable sort order, the database management tool 122 may determine whether a partial time range overlap exists by probing either a prior index entry or a subsequent index entry, but not both. If the index has a forward uni-directionally navigable sort order, then the tool 122 may probe only a subsequent index entry. In such case, the tool 122 may determine whether an overlap exists by determining whether a subsequent index entry exists with a start time prior to the end time of the request. That is, assuming the index is sorted on (key, start time, end time), then the index is probed using a candidate entry of the form (key, end time, start time). Again, note the reverse order of the start time and end time between the index structure and the probe. This approach will find an entry with the same key and a possibly overlapping time range (if one is present in the index) using a single call to the next function.

Conversely, if the index has a backward uni-directionally navigable sort order, then the tool 122 may probe only a prior index entry. In such case, the tool 122 may determine whether an overlap exists by determining whether a prior index entry exists with an end time subsequent to the start time of the request. These overlap analyses are based on an ascending sort order. Alternatively, the tool 122 may analyze a request based on a descending sort order.

If the index 124 has a bi-directionally navigable sort order, the database management tool 122 may treat the index as if it were uni-directionally navigable. Treating a bi-directionally navigable index as uni-directionally navigable may be beneficial, as in some cases a uni-directionally navigable sort order may be more efficient than a bi-directionally navigable sort order. However, an index that is inherently uni-directionally navigable, such as a singly linked list, may not be treated as bi-directionally navigable.

Figure 3:
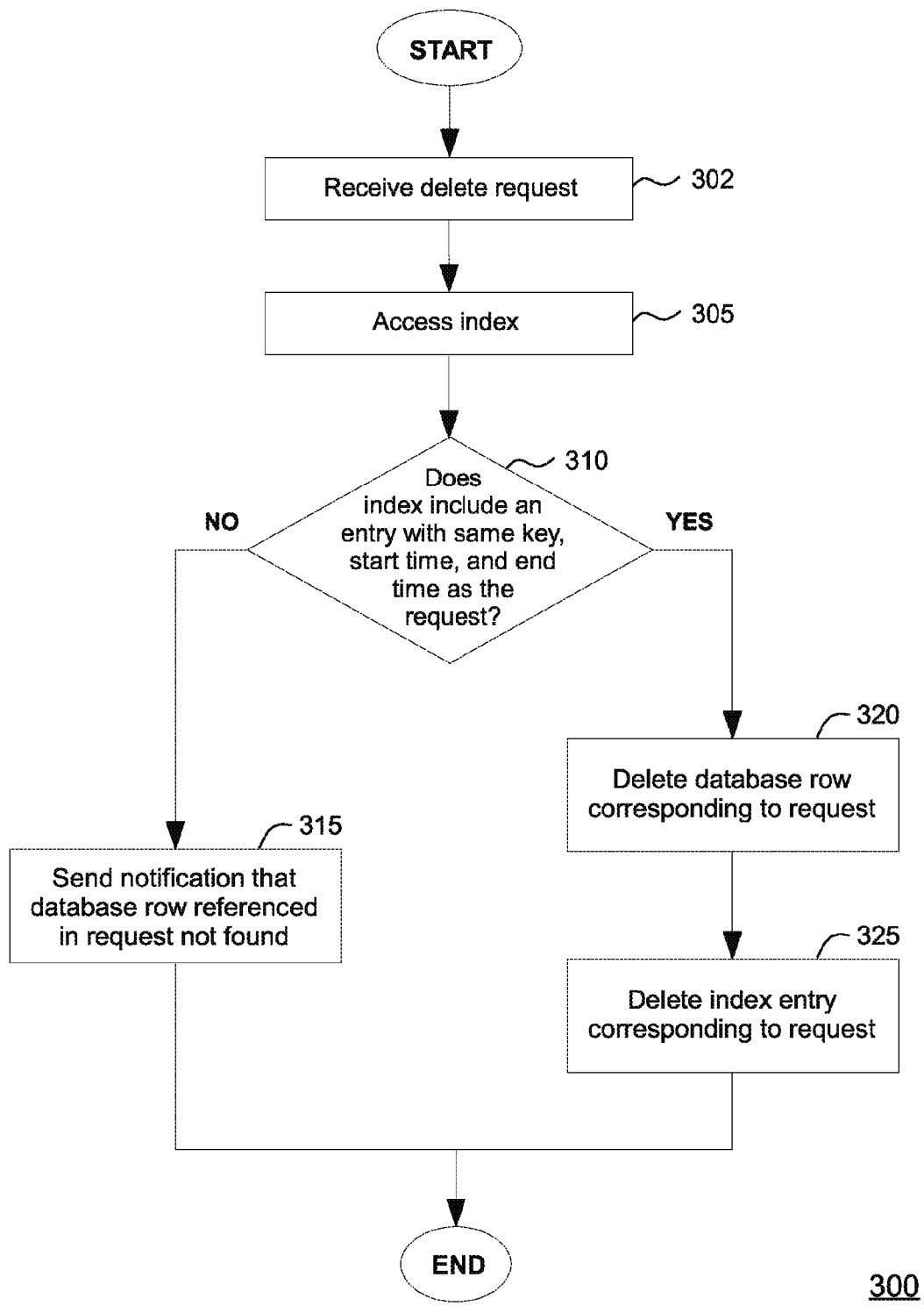
FIG. 3 illustrates a method for deleting a database row in a database table with an index having either a bi-directionally navigable sort order implementation or a uni-directionally navigable sort order, according to one embodiment of the invention.

FIG. 3 illustrates a method 300 for deleting a database row in a database table, according to one embodiment of the invention. The steps of the method 300 may be carried out by a database management tool in a server system having an index with either a uni-directionally navigable sort order or a bi-directionally navigable sort order. As shown, the method 300 begins at step 302, where the database management tool receives a request from a client computing system to delete a database row from a relational database managed by a RDBMS within the server system. The request includes a temporal key and an associated start time and end time, which may be used by the tool to identify to the row to be deleted. At step 305, the database management tool may access the index. At step 310, the database management tool may determine whether the index of the server system includes an entry with the same temporal key, start time and end time as the request. That is, to delete a row from the database, an exact match for each of the key, start time, and end time is required. If the database management tool determines that the index does not include such entry, then at step 315 the tool may send a notification to the client computing system indicating that the database row referenced in the request was not found. If the database management tool determines that the index includes such entry, then at step 320 the tool may direct the RDBMS to delete the database row corresponding to the identified index entry, and at step 325 the tool may delete the identified index entry.

In one embodiment, in response to a request from a client computing system to delete a set of database rows, a database management tool may delete the set of rows by following the steps of the method 300 for each row. That is, the tool may treat the set of delete requests as a sequence of single delete requests.

Figure 4:
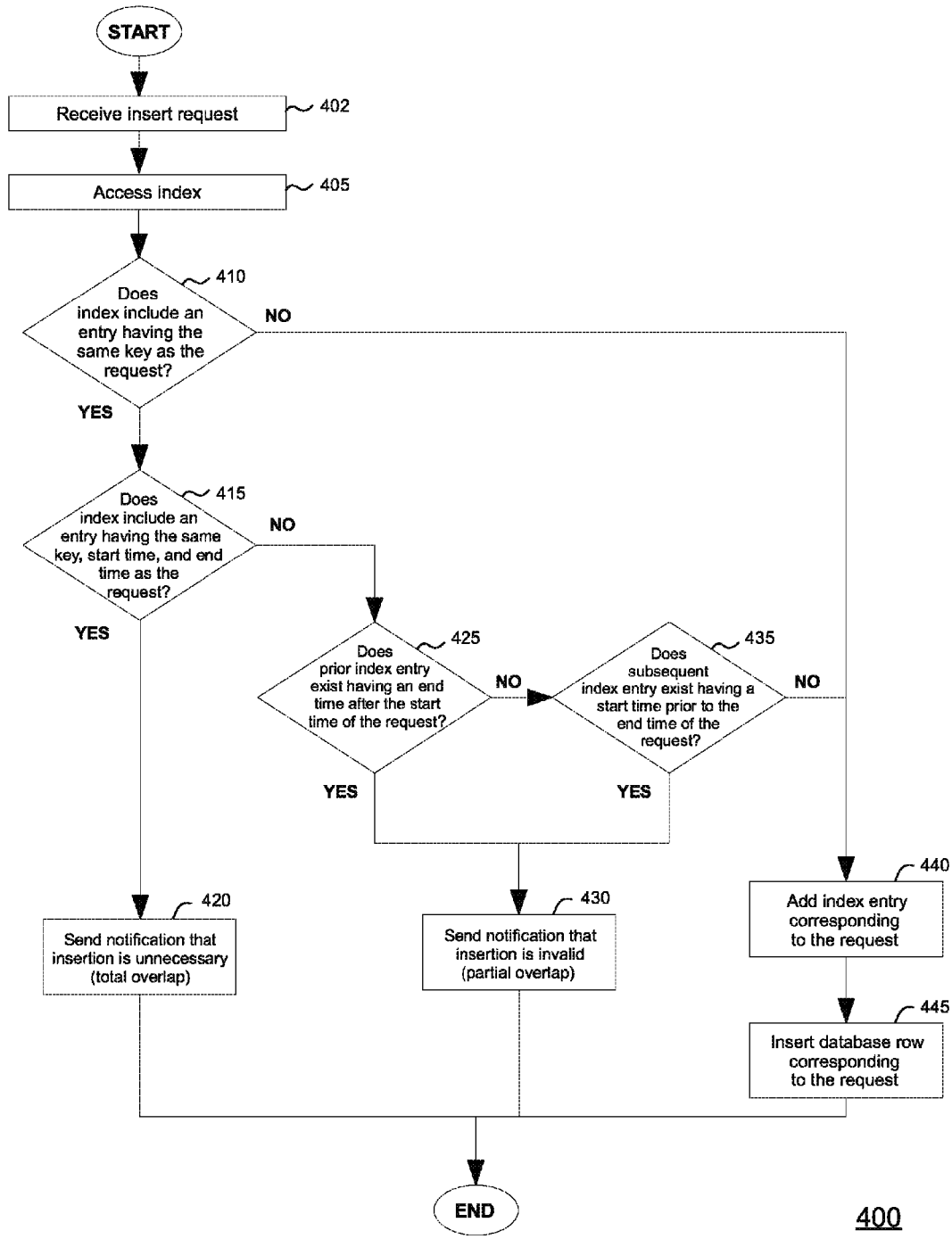
FIG. 4 illustrates a method for inserting a database row in a database table with an index having a bi-directionally navigable sort order, according to one embodiment of the invention.

FIG. 4 illustrates a method 400 for inserting a database row in a database table, according to one embodiment of the invention. The steps of the method 400 may be carried out by a database management tool in a server system having an index with a bi-directionally navigable sort order. As shown, the method 400 begins at step 402, where the database management tool receives a request to insert a database row into a database. In this example, the request includes a temporal key and an associated start time and end time for the row to be inserted. At step 405, the database management tool may access the index. At step 410, the database management tool may determine whether the index includes an entry (or entries) having the same temporal key as the request. If the index does not include an entry with the same temporal key, then the requested insertion does not violate the temporal key property. In such case, the process proceeds to step 440, described below. That is, if the index does not include any entries for the key value of a temporal key (key, start time, end time), then it may be inserted without regard for the start time and end time values associated with that temporal key.

Otherwise if at step 410 the database management tool determines that the index includes an entry having the same temporal key as the request, then at step 415 the tool may determine whether the index includes an entry with the same key, start time, and end time as the request. If the tool determines that the index includes an entry having the same temporal key, start time and end time as the request, then the requested insertion is a duplicate of an existing entry. In such case, the process may proceed to step 420, where the tool may send a notification to the client computing system indicating that the requested insertion would create a duplicate entry.

If at step 415 the database management tool determines that the index does not include an entry having the same temporal key, start time and end time as the request, then the tool may determine whether the time range of the request partially overlaps with the time range of one or more index entries. Specifically, at step 425 the tool may determine whether there is a prior index entry having an end time after the request start time. In this context, the prior index entry is the highest entry in the index that sorts lower than the request and that has the same temporal key as the request. That is, the temporal key for the row being inserted (key, start time, end time) matches the key in the index entry returned using the prior function. If the tool determines that such prior index entry exists, then at step 430 the tool sends a notification to the client computing system indicating that the requested insertion is invalid due to a time range overlap. For example, assume a temporal key value of (A, day 12, day 20) is used as a probe and that the prior function returns a temporal key of (A, day 7, day 14). Again, the key returned by the prior function represents the entry in the index that sorts lower than the request. In this example, the as entry returned by the prior function has the same key value "A," the system evaluates the end time of index entry (day 14) against the start time of the input (day 12) and finds an overlap between the end time of the prior key and the start time of the input. Accordingly, the database management tool rejects this insertion as violating the key-uniqueness requirement. As another example, again assume a temporal key of (A, day 12, day 20), but that the prior function returns a key of (A, day 7, day 11). In this case, the requested input has a start time that begins after the end time of the index entry returned by the prior key. Thus, the requested input does not conflict with a prior key. However, it may conflict with a subsequent entry in the index. Of course, if the prior entry has a different key value alto her (e.g., (B, Day X, day Y)), then the input key passes this element of the insertion checks.

At step 435 the tool may determine whether there is a subsequent index entry having a start time prior to the end time of the request. In this context, the subsequent index entry is the lowest entry in the index that sorts higher than the request and that has the same temporal key as the request. If the tool determines that such subsequent index entry exists, then at step 430 the tool sends a time range overlap notification. For example, again using an input temporal key of (A, day 12, day 20), assume the next function returns an index entry of (A, day 19, day 30). In such a case, as the end time of the input overlaps with the start time of the entry identified using the next function, the tool rejects the input. Alternatively, if the next function returned a key of (A, day 25, day 30) (or returned NULL (indicating that the input is greater than any entry in the list) or returned an entry with a different key (e.g., B, day 1, day 13)) then the tool can safely insert the input into the database and index without creating an overlap. That is, if the tool determines that such subsequent index entry does not exist, then the tool has determined that a time range overlap does not exist. Accordingly, at step 440 the tool may add an index entry corresponding to the request, and at step 445 the tool may direct the RDBMS to insert a database row corresponding to the request. Putting both tests together for a valid insert using the tests above:

Prior=(A, day 7, day 11)
Input=(A, day 12, day 20)
Next=(A, day 25, day 30)

Again, the end time of the prior entry does not overlap with the start time of the input temporal key, and the end time of the temporal key does not overlap with the start time of the next entry. Note, in this example, the index is sorted in an ascending order, as noted, the approach described above may readily be adapted for an index sorted in a descending order as well.

In one embodiment, in response to a request from a client computing system to insert a set of database rows using a bi-directionally navigable sort order implementation, a database management tool may insert the set of rows by following the steps of the method 400 for each insert. That is, the tool may treat the set of insert requests as a sequence of single insert requests.

In another embodiment, a database management tool may update a single row by combining the methods 300 and 400. Specifically, in response to a request from a client computing system to update a single database row using a bi-directionally navigable sort order implementation, the tool may delete the row identified in the request according to the method 300 described above and subsequently attempt to insert a new row with updated information provided in the request. If the insert is successful, then the new entry is stored in the index and the database. If not, then the update is rolled back, restoring the row deleted by the method 300 to both the database and the index.

Figure 5A:
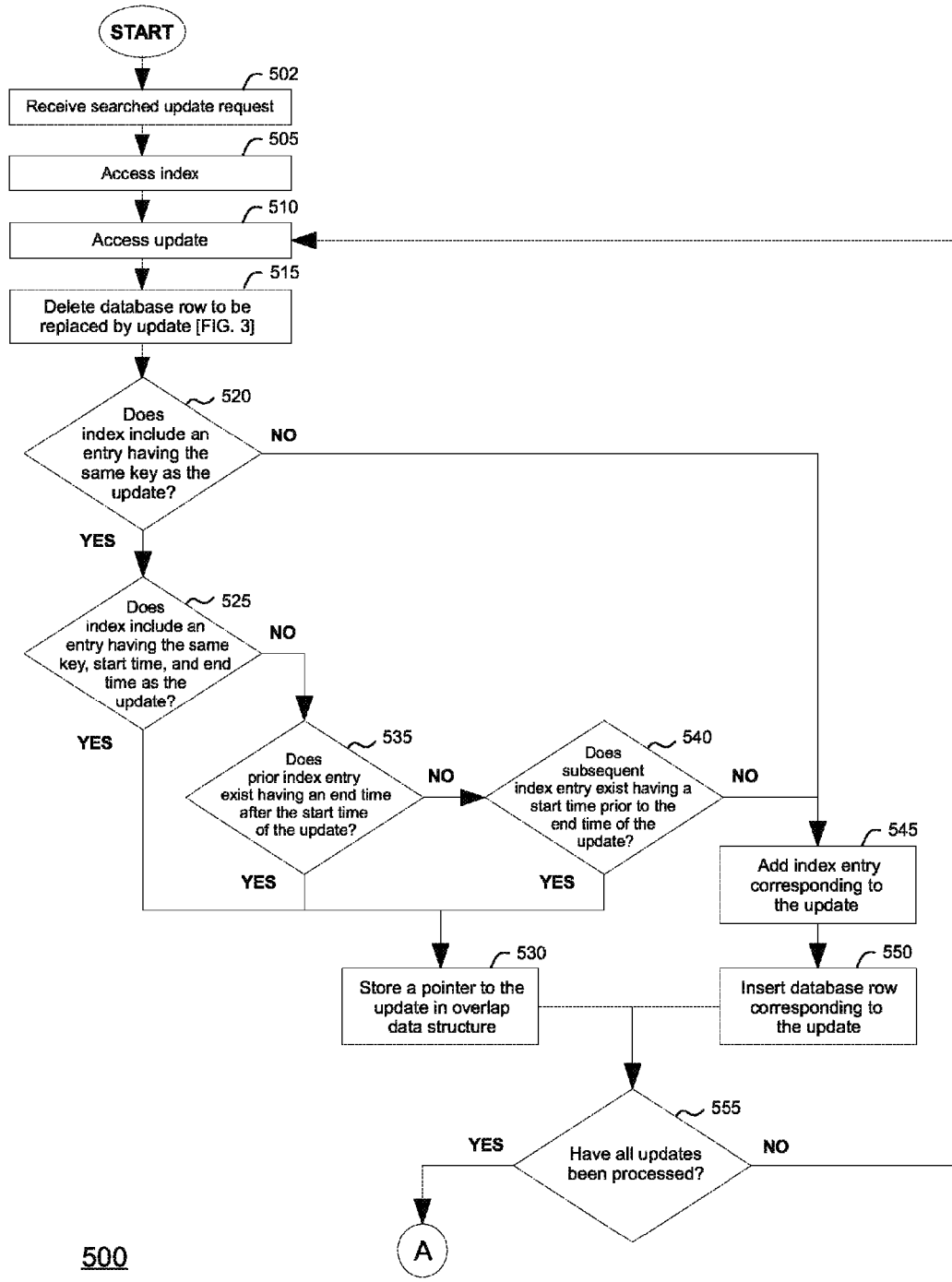
FIGS. 5A and 5B illustrate a method for performing a searched update of one or more database rows in a database table with an index having a bi-directionally navigable sort order, according to one embodiment of the invention.
Figure 5B:
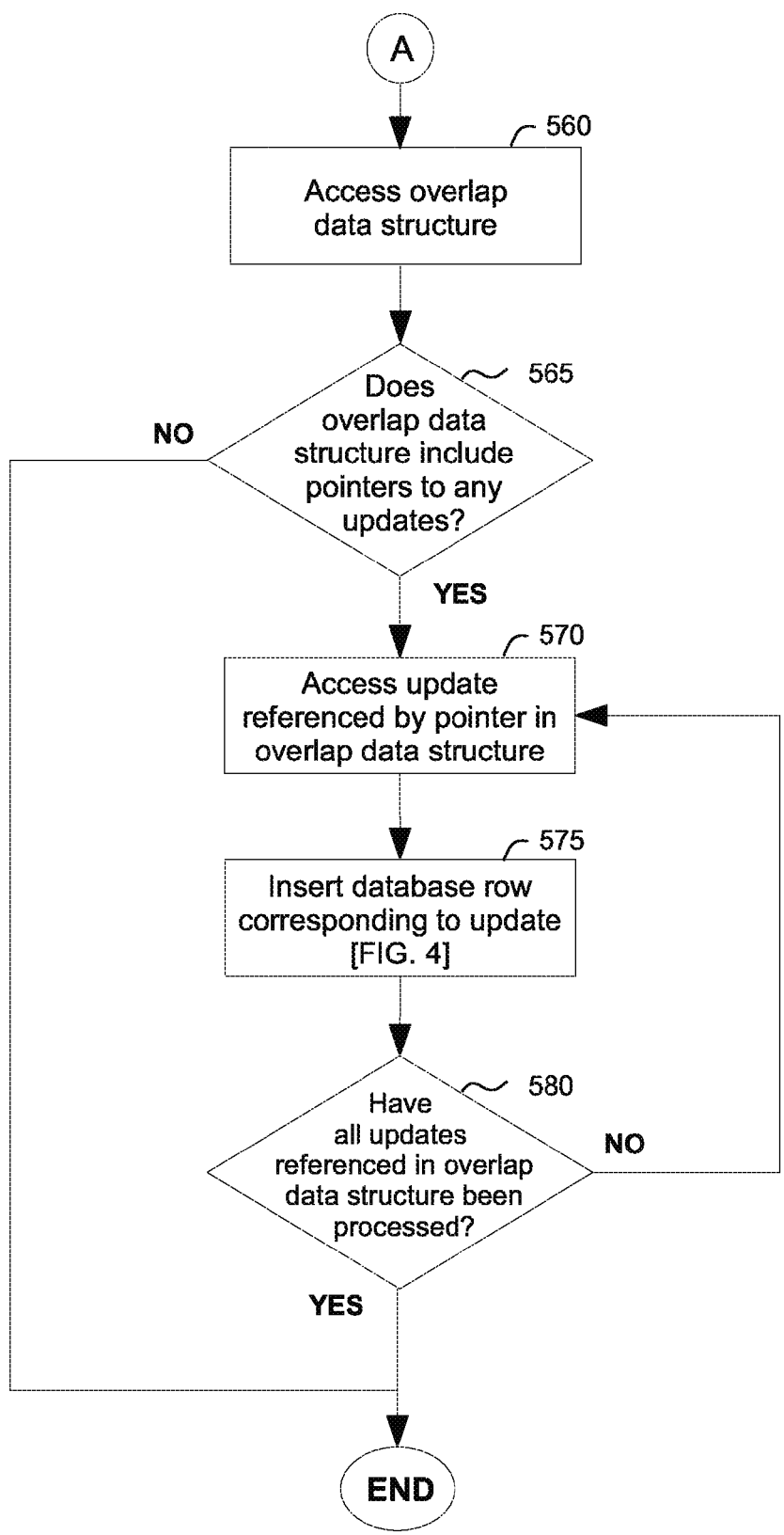

FIGS. 5A and 5B illustrate a method 500 for performing a group or searched update of one or more rows in a database table, according to one embodiment of the invention. The steps of the method 500 may be carried out by a database management tool in a server system having an index with a bi-directionally navigable sort order. A group or set update requires further processing than a single insertion, since the database management tool must address any time range overlaps that occur temporarily due to successive updates made during the group update. To address such temporary overlaps, the database management tool may store pointers to one or more updates in an overlap data structure, which is discussed below.

As shown in FIG. 5A, the method 500 begins at step 502, where the database management tool receives a request from a client computing system to perform a searched update of one or more rows in a relational database managed by a RDBMS within the server system. The searched update request may include instructions to update the time range for all rows having a given temporal key. For example, a searched update request may include database language (e.g., SQL) statements for updating the start time and/or end time of all database rows having a given temporal key. Thus, the client computing system requests one or more updates, each of which includes a temporal key and an associated start time and end time. At step 505, the database management tool may access the index. Upon accessing the index, the tool may proceed with processing each requested update. Specifically, at step 510, the tool may access an update. At step 515, the tool may delete the database row to be replaced by the update according to the method 300 described above. At step 520, the tool may determine whether the index of the server system includes an entry having the same temporal key as the update. If the tool determines that the index does not include an entry having the same temporal key as the update, then the requested update does not violate the requirement that each temporal key remain distinct. In such case, the process proceeds to step 545, described below.

If at step 520 the database management tool determines that the index includes an entry having the same temporal key as the update, then at step 525 the tool may determine whether the index includes an entry having the same temporal key, start time and end time as the update. If so, then a total time range overlap exists, since the database already includes a row having the same temporal key and the same time range designated in the update. However, such total overlap may be a temporary overlap occurring as a result of the update overlapping with an index entry that has not yet been updated. Thus, at step 530 the tool stores a pointer to the update in the overlap data structure so that the tool may access the update for further processing. Then, the process proceeds to step 555, described below.

If the database management tool determines that the index does not include an entry having the same temporal key, start time and end time as the update, then the tool may determine whether the time range of the update partially overlaps with the time range of one or more index entries. More specifically, at step 535 the tool may determine whether there is a prior index entry having an end time after the start time of the update. In this context, the prior index entry is the highest entry in the index that sorts lower than the update and that has the same key as the update. If the tool determines that such prior index entry exists, then at step 530 the tool may store a pointer to the update in the overlap data structure. If the tool determines that such prior index entry does not exist, then at step 540 the tool may determine whether there is a subsequent index entry having a start time prior to the end time of the update. In this context, the subsequent index entry is the lowest entry in the index that sorts higher than the update and that has the same key as the update. If the tool determines that such subsequent index entry exists, then at step 530 the tool may store a pointer to the update in the overlap data structure. If the tool determines that such subsequent index entry does not exist, then the tool has determined that a time range overlap does not exist. Accordingly, at step 545 the tool may add an index entry corresponding to the update, and at step 550 the tool may direct the RDBMS to insert a database row corresponding to the update.

At step 555, the database management tool may determine whether all updates have been processed. If one or more updates have not been processed, then the process may return to step 510, where the tool may access the next update.

If all updates have been processed, then the process may proceed to step 560, as shown in FIG. 5B. At step 560 the tool may access the overlap data structure. At step 565 the tool may determine whether the overlap data structure includes pointers to any updates. If the overlap data structure does not include any pointers, then the process ends. If the overlap data structure includes one or more pointers, then at step 570 the tool may access an update referenced by a pointer in the data structure. At step 575 the tool may insert a database row corresponding to the update according to the method 400. By following the steps of the method 400 at step 575, the tool may complete any updates previously impeded by temporary overlaps. The overlap data structure processing of steps 570-575 enables the tool to separate the temporary overlaps created by successive updates from non-temporary overlaps that remain after the tool completes the searched update.

At step 580, the database management tool may determine whether all updates referenced in the overlap data structure have been processed. If one or more updates have not been processed, then the process may return to step 570, where the tool may access the next update referenced in the overlap data structure, and steps 575-580 may be repeated. If all updates have been processed, then the process ends.

Table 1 provides a RDBMS database table to be updated in an example scenario using the method 500. The database table provides a listing of relationships between clients and client representatives for a given business over time periods designated by the "Rel Start" and "Rel End" columns. Thus, the "Rel Start" and "Rel End" respectively indicate the start time and the end time of a relationship between a client and a client representative. It is assumed that the business requires that all interactions with a client be handled by a single client representative. Accordingly, for this example the "Client" column of the database table is the temporal key.

TABLE 1

| Client | Client Representative | Start | End |
| --- | --- | --- | --- |
| Alpha | Don Spring | Jan. 01, 2007 | Dec. 01, 2008 |
| Alpha | Jess Washington | Dec. 01, 2008 | Jan. 01, 2009 |
| Alpha | Don Spring | Jan. 01, 2009 | Jan. 01, 2010 |
| Beta | Cameron Garcia | Jun. 01, 2005 | Jan. 01, 2009 |
| Delta | Shaula Hirsch | Jan. 01, 2008 | Jan. 01, 2009 |
| Gamma | Jason Chang | Jun. 01, 2007 | Jun. 01, 2009 |
| Omega | Shaula Hirsch | Jun. 01, 2007 | Jun. 01, 2009 |

In the example, a database management tool receives a searched update request at step 505. In the request, the following SQL commands are provided:

```
UPDATE
SET START=START+1 MONTH
    LEND=END+1 MONTH
WHERE CLIENT='Alpha'
```

Based on the SQL commands, the tool is to update the first three rows for which the client is "Alpha." The SQL commands instruct a database management tool to update each row for the client "Alpha" such that the start time and end time for each row are moved back one month. An index may include entries with temporal key (client), start time and end time information corresponding to the respective rows of the database table.

At step 510, the database management tool accesses an update to be processed. For this example, it is assumed that the database management tool processes the update the first "Alpha" row, followed by the second "Alpha" row, and followed by third "Alpha" row (however, the end result of the method 500 is the same regardless of the order in which the updates are processed). Thus, the tool accesses the first "Alpha" row. At step 515, the tool deletes the first "Alpha" row (and its corresponding index entry) by following the steps of the method 300. Then, at step 520, the tool determines that the index includes an entry with the key in the update ("Alpha"), since the table includes the second "Alpha" row and the third "Alpha" row. At step 525, the tool determines that there is no index entry with the same key, start time, and end time as the desired update for the first "Alpha" row, since there is no "Alpha" database row with a start time of "02/01/2007" and an end time of "01/01/2009." At step 530, the tool determines that there is no prior index entry with an end time after the start time of the update. Thus, the process proceeds to step 540, where the tool determines that there is a subsequent index entry with a start time prior to the end time of the update. Specifically, the tool determines that the start time of the second "Alpha" database row, which has not yet been updated, has a start time of "12/01/2008," which is prior to the "01/01/2009" end time of the update. Accordingly, at step 530 the tool stores a pointer to the first "Alpha" row update in an overlap data structure.

Since there are two more "Alpha" database rows to be processed, the process returns to step 510, where the tool accesses the second "Alpha" row. At step 515, the tool deletes the second "Alpha" row (and its corresponding index entry) by following the steps of the method 300. Then, at step 520, the tool determines that the index includes an entry with the key in the update ("Alpha"), since the table still includes the third "Alpha" row. At step 525, the tool determines that there is no index entry with the same key, start time, and end time as the desired update for the second "Alpha" row, since there is no "Alpha" database row with a start time of "01/01/2009" and an end time of "02/01/2009." At step 530, the tool determines that there is no prior index entry with an end time after the start time of the update. Thus, the process proceeds to step 540, where the tool determines that there is a subsequent index entry with a start time prior to the end time of the update. More specifically, the tool determines that the start time of the third "Alpha" database row, which has not yet been updated, has a start time of "01/01/2009," which is prior to the "02/01/2009" end time of the update. Accordingly, at step 530 the tool stores a pointer to the second "Alpha" row update in the overlap data structure.

Since the tool has not processed third "Alpha" database row, the process returns to step 510, where the tool accesses the third "Alpha" row. At step 515, the tool deletes the third "Alpha" row (and its corresponding index entry) by following the steps of the method 300. Then, at step 520, the tool determines that the index does not include an entry with the key in the update ("Alpha"), since all of the index entries corresponding to the "Alpha" database rows have been deleted. Thus, at step 545 the tool adds an index entry corresponding to the update, and at step 550 the tool directs the RDBMS to insert a row in the database table corresponding to the update. At step 555, the tool determines that all updates have been processed. Accordingly, the process proceeds to step 560.

At step 560, the tool accesses the overlap data structure. At step 565 he tool determines that the overlap data structure includes pointers to the first "Alpha" row update and the second "Alpha" row update. Thus, at step 570 accesses the first "Alpha" update referenced in the overlap data structure. At step 575, the tool inserts an index entry and database row corresponding to the first "Alpha" update by following the steps of the method 400. At step 580 the tool determines that the second "Alpha" update referenced in the overlap data structure has yet to be processed. Accordingly, the process returns to step 570, where the tool accesses the second "Alpha" update. At step 575, the tool inserts an index entry and database row corresponding to the first "Alpha" update by following the steps of the method 400. Then, at step 580 the tool determines that all updates referenced in the overlap data structure, and the process ends.

Table 2 shows the changes made to Table 1 as a result of the searched update completed during the method 500. As requested by the SQL commands, the start time and the end time for each "Alpha" database row have been moved back one month.

TABLE 2

| Client | Client Representative | Start | End |
| --- | --- | --- | --- |
| Alpha | Don Spring | Feb. 01, 2007 | Jan. 01, 2009 |
| Alpha | Jess Washington | Jan. 01, 2009 | Feb. 01, 2009 |
| Alpha | Don Spring | Feb. 01, 2009 | Feb. 01, 2010 |
| Beta | Cameron Garcia | Jun. 01, 2005 | Jan. 01, 2009 |
| Delta | Shaula Hirsch | Jan. 01, 2008 | Jan. 01, 2009 |
| Gamma | Jason Chang | Jun. 01, 2007 | Jun. 01, 2009 |
| Omega | Shaula Hirsch | Jun. 01, 2007 | Jun. 01, 2009 |

As discussed above, updates to the first "Alpha" row and the second "Alpha" row were temporarily impeded by overlaps created by database rows that had not yet been updated. The processing involving the overlap data structure permitted the tool to address the temporary overlaps such that all database rows were properly updated. As shown in the example, the method 500 enables a tool to make all necessary updates while properly enforcing the temporal key property in a database table.

FIGS. 3, 4, 5A, and 5B illustrate an example embodiment where the index stores temporal keys according to sort order (e.g., ascending) and where the database may be searched bi-directionally (e.g., using the prior function to find the highest entry preceding a given input temporal key and the next function to find the lowest entry following the input temporal key. In an alternative embodiment, the index may be searched only unidirectional (e.g., using only the next function for an index sorted in an ascending direction).

Figure 6:
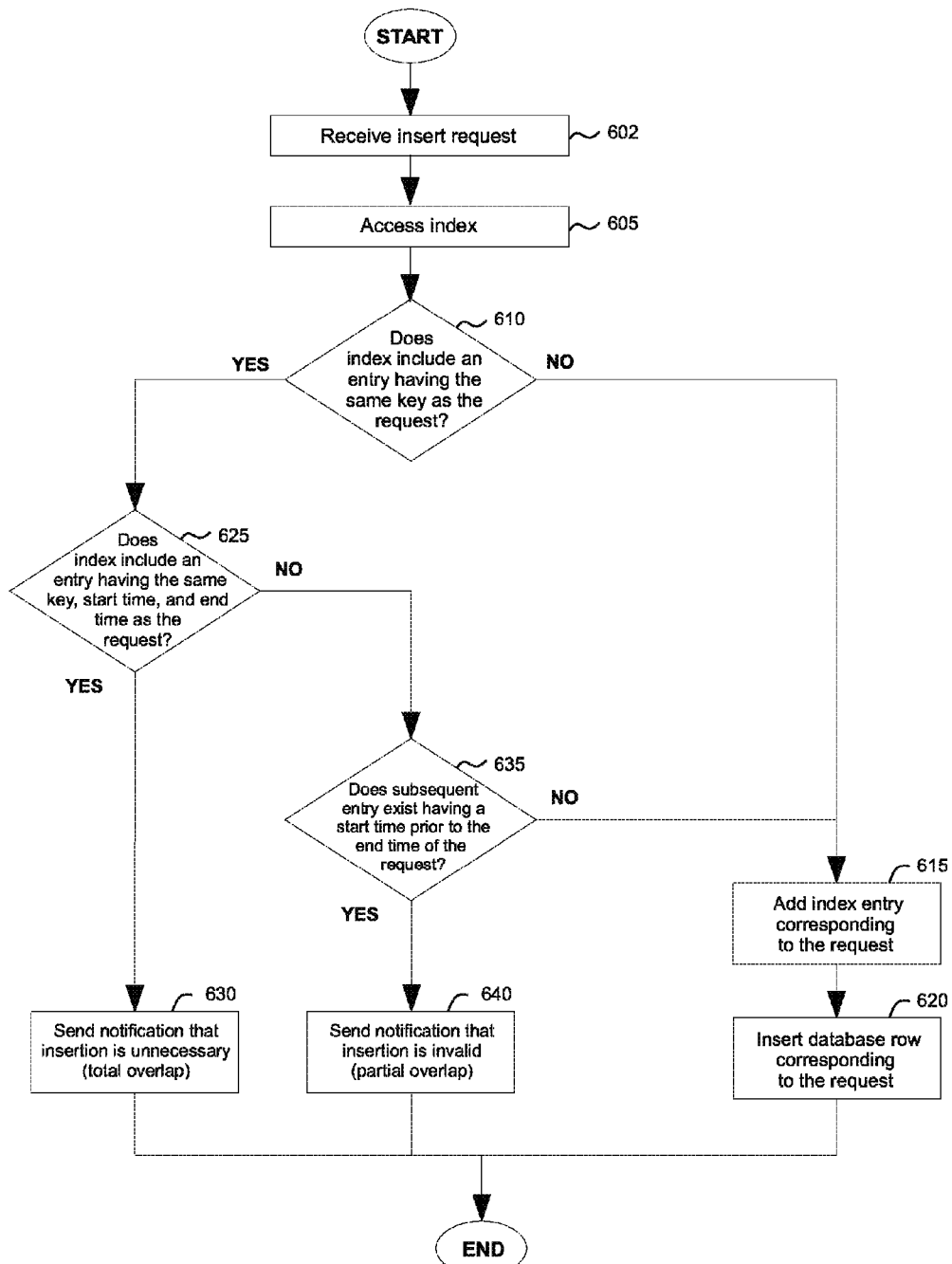
FIG. 6 illustrates a method for inserting a database row in a database table with an index having a forward uni-directionally navigable sort order, according to one embodiment of the invention.

FIG. 6 illustrates a method 600 for inserting a single database row in a database table, according to one embodiment of the invention. The steps of the method 600 may be carried out by a database management tool in a server system having an index with a forward uni-directionally navigable sort order (i.e., an index in which the tool may access the lowest entry that sorts higher than a request). In this example, assume the temporal key index has a ascending sort order built on the (temporal key, end time, start time). As shown, the method 600 begins at step 602, where the database management tool receives a request from a client computing system to insert a single database row into a relational database managed by a RDBMS within the server system. The request includes a temporal key and an associated start time and end time for the row to be inserted (key, start time, end time). At step 605 the database management tool may access the index. At step 610, the database management tool may determine whether the index includes an entry having the same temporal key as the request. If the database management tool determines that the index does not have an entry with the same temporal key as the request, then the requested insertion does not violate the temporal key property. In such case, the process may proceed to steps 615, where the tool may add an index entry corresponding to the request. Then, at step 620 the tool may direct the RDBMS to insert a database row corresponding to the request. For example, assume an input temporal key of (A, start=day 12, end=day 20). The index may be probed using next (input key, start time, end time). That is, (A, day 12, day 20). Note, although sorted on (key, end time, start time), the index is probed using the reverse order of the temporal values. If this returns a value of (B, day 11, day 1), then the entry (A, day 12, day 20) may be inserted. This result holds because the "next" entry returned is the next entry in the index following the key and end time. Stated differently, the start time of (A, day 12, day 20) is greater than the end time of any preceding entry that might have "A" as a key value. As the next entry is (B, day 11, day 1), the key (A, day 12, day 20) may be inserted into the database and the index as (A, day 20, day 12) without violating the requirement that keys sharing a temporal key value may not have overlapping time ranges.

If at step 610 the database management tool determines that the index includes an entry having the same temporal key as the request, then at step 625 the tool may determine whether the index includes an entry having the same temporal key, start time, and end time as the request. If the tool determines that the index includes an entry having the same temporal key, start time and end time as the request, then the requested fails as it would create a duplicate entry.

If at step 625 the database management tool determines that the index does not include an entry having the same temporal key, start time and end time as the request, then the tool may determine whether the time range of the request partially overlaps with the time range of one or more index entries. More specifically, at step 635 the tool may determine whether there is a subsequent index entry having a start time prior to the end time of the request. In this context, the subsequent index entry is the lowest entry in the index that has the same temporal key as the request and that sorts higher than the request. Again using a temporal key of (A, start=day 12, end=day 20) as an example, assume the next function returns a key of (A, end=day 11, start 7). Here again, note the index has an ascending sort order of (Key, end time, start time), but is probed using a reverse of the start time and end time. In cases where a matching temporal key is present (i.e., entries with a matching key value of "A") the next function returns the lowest key in the index with a sort position following the input. Specifically, by probing the index using (key, start time, end time), the next function returns the temporal key in the index with the lowest end time following the start time of the input key. If the start time of the input key precedes this end time, then an overlap exists.

Otherwise, if the tool determines that no subsequent index entry exists having a start time prior to the end time, then no overlap exists, and the process may proceed to steps 615-620, where the tool may add an index entry corresponding to the request and may direct the RDBMS to insert a database row corresponding to the request. If the tool determines that that a subsequent index entry exists having a start time prior to the request end time, then at step 640 the tool may send a notification to the client computing system indicating that the requested insertion is invalid due to a time range overlap.

In one embodiment, in response to a request from a client computing system to insert a set of database rows using a forward uni-directionally navigable sort order implementation, a database management tool may insert the set of rows by following the steps of the method 600 for each insert. That is, the tool may treat the set of insert requests as a sequence of single insert requests.

In another embodiment, a database management tool may update a single row by combining the methods 300 and 600. Specifically, in response to a request from a client computing system to update a single database row using a forward uni-directionally navigable sort order implementation, the tool may delete the row identified in the request according to the method 300 described above and subsequently may insert a new row with updated information provided in the request according to the method 600.

Figure 7A:
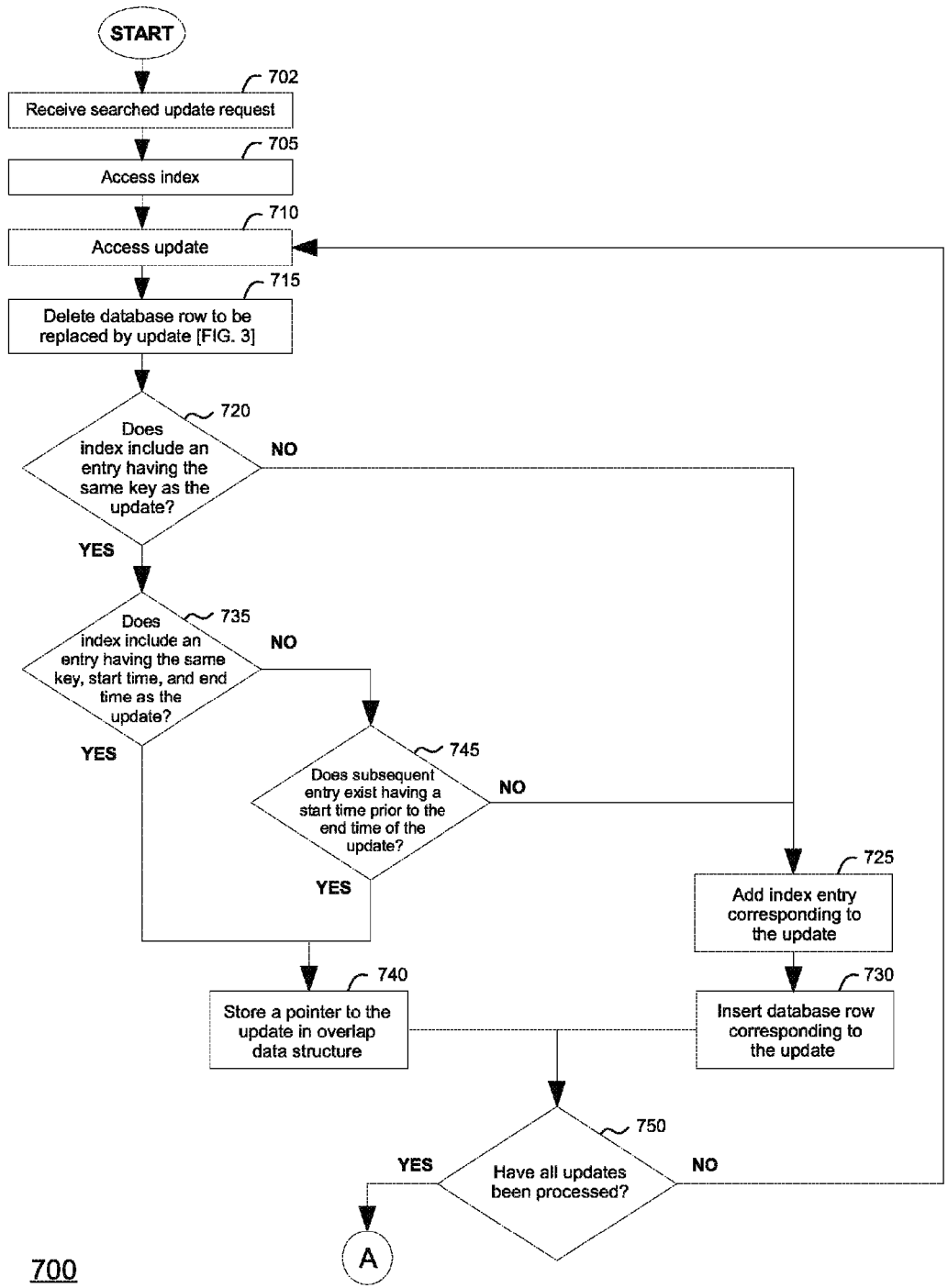
FIGS. 7A and 7B illustrate a method for performing a searched update of one or more database rows in a database table with an index having a forward uni-directionally navigable sort order, according to one embodiment of the invention.
Figure 7B:
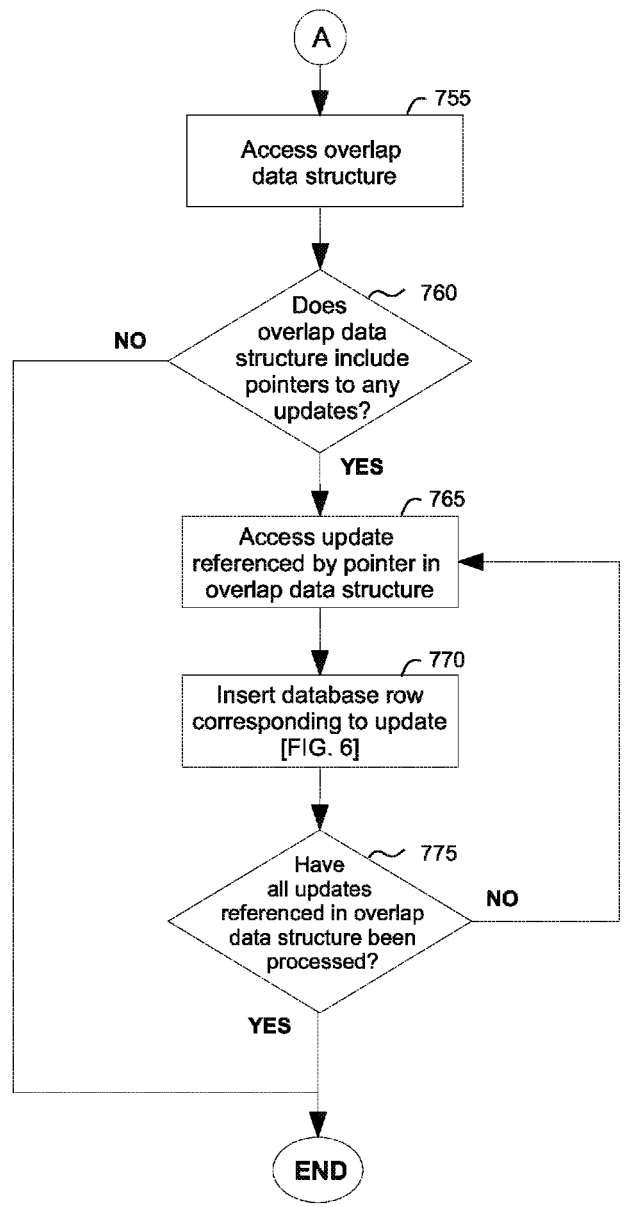

FIGS. 7A and 7B illustrate a method 700 for performing a group or searched update of one or more database rows in a database table, according to one embodiment of the invention. The steps of the method 700 may be carried out by a database management tool in a server system having an index with a forward uni-directionally navigable sort order. As with the method 500, in the method 700 the database management tool must address any temporary time range overlaps due to successive updates made during the searched update. To address such temporary overlaps, the database management tool may store pointers to one or more updates in an overlap data structure.

As shown in FIG. 7A, the method 700 begins at step 702, where the database management tool receives a request from a client computing system to perform a searched update of one or more rows in a relational database managed by a RDBMS within the server system. The searched update request may include instructions to update the time range for all rows having a given temporal key. For example, a searched update request may include database language (e.g., SQL) statements for updating the start time and/or end time of all database rows having a given temporal key. Thus, the client computing system requests one or more updates, each of which includes a temporal key and an associated start time and end time. At step 705, the database management tool may access the index. At step 710, the database management tool may access an update. At step 715, the tool may delete the database row to be replaced by the update according to the method 300 described above. At step 720, the database management tool may determine whether the index of the server system includes an entry having the same temporal key as the update. If the database management tool determines that the index does not include an entry having the same temporal key as the update, then the requested update does not violate the temporal key property. In such case, the process may proceed to step 725, where the tool may add an index entry corresponding to the update. Then, at step 730 the tool may direct the RDBMS to insert a database row corresponding to the update.

If at step 720 the database management tool determines that the index include an entry with the update key, then at step 735 the tool may determine whether the index includes an entry having the same temporal key, start time, and end time as the update. If the tool determines that the index includes an entry having the temporal key, start time and end time as the update, then a total time range overlap exists, since the database already includes a row having the same temporal key and the same time range designated in the update. However, such total overlap may be a temporary overlap occurring as a result of the update overlapping with an index entry that has not yet been updated. Thus, at step 740 the tool may store a pointer to the update in the overlap data structure so that the tool may access the update for further processing. Then, the process proceeds to step 750, described below.

If at step 735 the database management tool determines that the index does not include an entry having the same temporal key, start time and end time as the update, then the tool may determine whether the time range of the update partially overlaps with the time range of one or more index entries. Specifically, at step 745 the tool may determine whether there is a subsequent index entry having a start time prior to the end time of the update. In this context, the subsequent index entry is the lowest entry in the index that has the same temporal key as the update and that sorts higher than the update.

If at step 745 the database management tool determines that no subsequent index entry exists having a start time prior to the update end time, then no overlap exists, and the process may proceed to steps 725-730, where the tool may add an index entry corresponding to the update and may direct the RDBMS to insert a database row corresponding to the update. If the tool determines that there is a subsequent index entry having a start time prior to the update end time, then at step 740 the tool may store a pointer to the update in the overlap data structure.

At step 750, the database management tool may determine whether all updates have been processed. If one or more updates have not been processed, then the process may return to step 710, where the tool may access the next update.

If all updates have been processed, then the process may proceed to step 755, as shown in FIG. 7B. At step 755 the tool may access the overlap data structure. At step 760 the tool may determine whether the overlap data structure includes pointers to any updates. If the overlap data structure does not include any pointers, then the process ends. If the overlap data structure includes one or more pointers, then at step 765 the tool may access an update referenced by a pointer in the data structure. At step 770 the tool may insert a database row corresponding to the update according to the method 600. By following the steps of the method 600 at step 770, the tool may complete any updates previously impeded by temporary overlaps. The overlap data structure processing of steps 765-770 enables the tool to separate the temporary overlaps created by successive updates from non-temporary overlaps that remain after the tool completes the searched update.

At step 775, the database management tool may determine whether all updates referenced in the overlap data structure have been processed. If one or more updates have not been processed, then the process may return to step 765, where the tool may access the next update referenced in the overlap data structure, and steps 770-775 may be repeated. If all updates have been processed, then the process ends.

The methods 600 and 700 address insertions and searched updates carried out by a database management tool in a server system having an index with a forward uni-directionally navigable sort order. In another embodiment, a database management tool may insert database rows and perform searched updates of database rows in a server system having an index with a backward uni-directionally navigable sort order (i.e., an index in which the tool may access the highest entry that sorts lower than a request). The method steps for carrying out such insertions and searched updates are similar to the steps described above in the methods 600 and 700. However, in the context of a backward uni-directionally navigable sort order, the index of an ascending sort order is built on the temporal key column, followed by the start time column, followed by the end time column of the database table. Moreover, in this context, the tool may determine whether an overlap exists by determining whether a prior index entry exists having an end time after the start time of the relevant request or update.

Further, the methods 600 and 700 address insertions and searched updates via an index with an ascending sort order. In another embodiment, similar methods may address insertions and searched updates via an index with a descending sort order. Further still, a descending sort order may be used in both forward and backward uni-directionally navigable sort order implementations. More generally, a search and/or insert function for a temporal key index may be implemented using any predicates on (primary key, start time, end time) for an index structure built on any combination of {(primary key, start time, end time) or (primary-key, end time, start time)}, {ascending, descending}, {forward, reverse, bidirectional traversal} using the approaches discussed herein.

Thus, advantageously, embodiments of the invention provide a technique for preserving data integrity in a database table. By addressing time range overlaps in an index having a sort order for temporal keys, a database management tool of a server system may efficiently process client requests while enforcing a temporal key property in the table.

While the foregoing is directed to embodiments of the present invention, other and further embodiments of the invention may be devised without departing from the basic scope thereof. The scope thereof is determined by the claims that follow.

What is claimed is:

1. A computer-implemented method for enforcing a temporal key property in a database table, the method comprising:

receiving a request to insert a row in the table, wherein the request includes a temporal key which includes a key value, an associated start time, and an associated end time;

accessing, by operation of one or more computer processors, an index of temporal keys in the table, wherein the index has a sort order defined on the key value, end time, and start time of the index entries; and upon determining that the index includes one or more entries having the key value of the request:

modifying the request by reversing an order of the start time and the end time in the request, probing the index with the modified request to determine whether an overlap exists between the start time and the end time of the modified request and one of the entries having the key value of the request, wherein determining whether the overlap exists comprises determining that a subsequent entry in the index has the key value of the request and a start time prior to the end time of the modified request, the subsequent index entry being the lowest entry in the index that sorts higher in the index than the modified request, and upon determining, based on the probe, that the overlap exists, rejecting the request to insert the row in the table.

2. The method of claim 1, further comprising:

upon determining that the start time and the end time of the modified request do not overlap with the start time and the end time of any of the one or more entries in the index having the key value of the request, adding an entry to the index corresponding to the request and inserting the row into the database table.

3. The computer-implemented method of claim 1, wherein determining whether the start time and the end time of the modified request overlaps with the start time and the end time of one of the entries having the key value of the request further comprises:

determining whether the index includes an entry having the key value, start time, and end time of the request.

4. A computer-implemented method for enforcing a temporal key property in a database table, the method comprising:

receiving a request to insert a row in the table, wherein the request includes a temporal key which includes a key value, an associated start time, and an associated end time;

accessing, by operation of one or more computer processors, an index of temporal keys in the table, wherein the index has a sort order defined on the key value, start time, and end time of the index entries; and upon determining that the index includes one or more entries having the key value of the request:

modifying the request by reversing an order of the start time and the end time in the request, probing the index with the modified request to determine whether an overlap exists between the start time and the end time of the modified request and one of the entries having the key value of the modified request wherein determining whether the start time and the end time in the request overlaps with the start time and the end time of one of the entries having the key value of the request comprises determining whether a prior index entry exists having an end time after the start time of the modified request, the prior index entry being the highest entry in the index that sorts lower than the modified request and that has the key value of the request, and upon determining, based on the probe, that the overlap exists, rejecting the request to insert the row in the table.

5. A non-transitory computer-readable storage medium storing an application, which, when executed, performs an operation for enforcing a temporal key property in a database table, the operation comprising:

receiving a request to insert a database row in the table, wherein the request includes a temporal key which includes a key value, an associated start time, and an associated end time;

accessing an index of temporal keys in the table, wherein the index has a sort order defined on the key value, end time, and start time of the index entries; and upon determining that the index includes one or more entries having the key value of the request:

modifying the request by reversing an order of the start time and the end time in the request, probing the index with the modified request to determine whether an overlap exists between the start time and the end time of the modified request and one of the entries having the key value of the request, wherein determining whether the overlap exists comprises determining that a subsequent entry in the index has (i) the key value of the request and (ii) a start time prior to the end time of the modified request, the subsequent index entry being the lowest entry in the index that sorts higher in the index than the modified request, and upon determining, based on the probe, that the overlap exists rejecting the request to insert the row in the table.

6. The computer-readable storage medium of claim 5, wherein the operation further comprises:

upon determining that the start time and the end time of the modified request do not overlap with the start time and the end time of any of the one or more entries in the index having the key value of the request, adding an entry to the index corresponding to the request and inserting the row into the database table.

7. The computer-readable storage medium of claim 5, wherein determining whether the start time and the end time in the modified request overlaps with the start time and the end time one of the entries having the key value of the request further comprises determining whether the index includes an entry having the key value, start time, and end time of the request.

8. A non-transitory computer-readable storage medium storing an application, which, when executed, performs an operation for enforcing a temporal key property in a database table, the operation comprising:

receiving a request to insert a row in the table, wherein the request includes a temporal key which includes a key value, an associated start time, and an associated end time;

accessing, by operation of one or more computer processors, an index of temporal keys in the table, wherein the index has a sort order defined on the key value, start time, and end time of the index entries; and upon determining that the index includes one or more entries having the key value of the request:

modifying the request by reversing an order of the start time and the end time in the request, probing the index with the modified request to determine whether an overlap exists between the start time and the end time of the modified request and one of the entries having the key value of the modified request wherein determining whether the start time and the end time in the request overlaps with the start time and the end time of one of the entries having the key value of the request comprises determining whether a prior index entry exists having an end time after the start time of the modified request, the prior index entry being the highest entry in the index that sorts lower than the modified request and that has the key value of the request, and upon determining, based on the probe, that the overlap exists, rejecting the request to insert the row into the database table.

9. A system comprising:

a processor; and a memory storing an application program, which, when executed on the processor, performs an operation for enforcing a temporal key property in a database table, the operation comprising:

receiving a request to insert a row in the database table, wherein the request includes a temporal key which includes a key value, an associated start time, and an associated end time, accessing, by operation of one or more computer processors, an index of temporal keys in the table, wherein the index has a sort order defined on the key value, end time, and start time of the index entries, and upon determining that the index includes one or more entries having the key value of the request:

modifying the request by reversing an order of the start time and the end time in the request;

probing the index with the modified request to determine whether an overlap exists between the start time and the end time of the modified request and one of the entries having the key value of the request, wherein determining whether the overlap exists comprises determining that a subsequent entry in the index has the key value of the request and a start time prior to the end time of the modified request, the subsequent index entry being the lowest entry in the index that sorts higher in the index than the modified request; and upon determining, based on the probe, that the overlap exists, rejecting the request to insert the row into the database table.

10. The system of claim 9, wherein the operation further comprises:

upon determining that the start time and the end time of the modified request do not overlap with the start time and the end time of any of the one or more entries in the index having the key value of the request, adding an entry to the index corresponding to the request and inserting the row into the database table.

11. The system of claim 9, wherein determining whether the start time and the end time in the request overlap with the start time and the end time of one of the one or more entries having the key value of the request further comprises determining whether the index includes an entry having the key value, start time, and end time of the request.

12. A system comprising:

a processor; and a memory storing an application program, which, when executed on the processor, performs an operation for enforcing a temporal key property in a database table, the operation comprising:

receiving a request to insert a row in the database table, wherein the request includes a temporal key which includes a key value, an associated start time, and an associated end time, accessing, by operation of one or more computer processors, an index of temporal keys in the table, wherein the index has a sort order defined on the key value, end time, and start time of the index entries, and upon determining that the index includes one or more entries having the key value of the request:

modifying the request by reversing an order of the start time and the end time in the request;

probing the index with the modified request to determine whether an overlap exists between the start time and the end time of the modified request and one of the entries having the key value of the modified request wherein determining whether the start time and the end time in the request overlaps with the start time and the end time of one of the entries having the key value of the request comprises determining whether a prior index entry exists having an end time after the start time of the modified request, the prior index entry being the highest entry in the index that sorts lower than the modified request and that has the key value of the request; and upon determining, based on the probe, that the overlap exists, rejecting the request to insert the row into the database table.

13. The method of claim 1, further comprising: upon determining that the index does not include any entries having the key value, adding an entry to the index corresponding to the request and inserting the row into the database table.

14. The computer-readable storage medium of claim 5, wherein the operation further comprises, upon determining that the index does not include any entries having the key value, adding an entry to the index corresponding to the request and inserting the row into the database table.

15. The system of claim 9, wherein the operation further comprises: upon determining that the index does not include any entries having the key value, adding an entry to the index corresponding to the request and inserting the row into the database table.

* * * * *